United States Patent [19]
Etzel

[11] Patent Number: 5,968,586
[45] Date of Patent: Oct. 19, 1999

[54] PRODUCTION OF κ-CASEIN MACROPEPTIDE FOR NUTRACEUTICAL USES

[75] Inventor: Mark R. Etzel, Madison, Wis.

[73] Assignee: Wisconsin Alumni Research Foundation, Madison, Wis.

[21] Appl. No.: 08/947,700

[22] Filed: Oct. 9, 1997

[51] Int. Cl.⁶ .............................. A23J 1/02; A23C 9/14; C12C 3/08; A23P 1/00
[52] U.S. Cl. ........................ 426/657; 426/271; 426/422; 426/495
[58] Field of Search .............................. 426/657, 41, 42, 426/271, 422, 495

[56] References Cited

U.S. PATENT DOCUMENTS

| | | |
|---|---|---|
| 5,061,622 | 10/1991 | Dosako et al. . |
| 5,075,424 | 12/1991 | Tanimoto et al. . |
| 5,216,129 | 6/1993 | Berrocal et al. . |
| 5,278,288 | 1/1994 | Kawasaki et al. . |
| 5,280,107 | 1/1994 | Kawasaki et al. . |
| 5,780,439 | 7/1998 | Mundy et al. .......................... 426/657 |

OTHER PUBLICATIONS

Coolbear, K.P., Elgar, D.F., Coolbear, T. & Ayers, J.S. (1996) Comparative study of methods for the isolation and purification of bovine κ–casein and its hydrolysis by chymosin. *Journal of Dairy Research*, 63:61–71.

Coolbear, K.P., Elgar, D.F. & Ayers, J.S. (1996) Profiling of genetic variants of bovine κ–casein macropeptide by electrophoretic and chromatographic techniques. *International Dairy Journal*, 6:1055–1068.

Adisaputro, I. A., et al., 1996, *J. Liq. Chrom. & Rel. Technol.*, 19(9) 1437–1450.

Ayers, J.S. et al., 1986, *New Zealand J. Dairy Sci. Technol.*, 21, 21–35.

Dalgleish, D.G., 1982, "The Enzymatic Coagulation of Milk," *Developments in Dairy Chemistry–1 Functional Milk Proteins*, (Edited by P.F. Fox), pp. 1–53, Applied Science Publishers, New York.

Etzel, M.R., 1995, "Whey Protein Isolation and Fractionation Using Ion Exchangers," *Bioseparation Processes in Foods*, R. K. Singh and S. S. H. Rizvi (eds.), Marcel Dekker, New York, Ch. 12.

Fox, P.F., 1989, "The Milk Protein System," *Developments in Dairy Chemistry–4 Functional Milk Proteins*, (Edited by P.F. Fox), pp. 1–53. Elsevier Applied Science, New York.

Kawakami, H., et al., 1992, "Determination of κ–casein Glycomacropeptide by High Performance Liquid Chromotography Without Trichloroacetic Acid Pretreatment," *Milchwissenschaft* 47, 688–693.

Kawasaki, Y., et al., 1993, "pH–Dependent Molecular Weight Changes of κ–casein Glycomacropeptide and its Preparation by Ultrafiltration," *Milchwissenschaft* 48, 191–195.

Marshall, S. C., 1991, "Casein Macropeptide From Whey—A New Product Opportunity," *Food Research Quarterly* 51, 86–89.

Outinen, M., 1995, "Chromatographic Isolation of κ–casein Macropeptide from Cheese Whey with a Strong Basic Anion Exchange Resin," *Milchwissenschaft* 50, 570–574.

Saito, T., et al., 1991, "A New Isolation Method of Casein Glycopeptide from Sweet Cheese Whey." *Journal of Dairy Science*, 74, 2831–2837.

Shammet et al., 1992, "Characteristics of Macropeptide Fraction Isolation from Whole Casein and Purified κ–casein." *Milchwissenschaft* 47, 615–619.

Tanimoto, M. et al., 1992, "Large–Scale Preparation of κ–casein Glycomacropeptide from Rennet Casein Whey," *Bioscience, Biotechnology and Biochemistry*, 56, 140–141.

Primary Examiner—Anthony J. Weier
Attorney, Agent, or Firm—DeWitt Ross & Stevens SC

[57] ABSTRACT

The present invention relates to a process for producing kappa-casein macropeptides having nutraceutical properties from whey using two ion exchangers of opposite polarity in series. A hydrolyzed kappa-casein macropeptide nutraceutical food product having less than about 4% total of the hydrophobic aromatic amino acids phenylalanine, tryptophan and tyrosine is also contemplated.

22 Claims, 10 Drawing Sheets

PRODUCTION OF κ-CASEIN MACROPEPTIDE FOR NUTRACEUTICAL USES

GOVERNMENT SUPPORT

This invention was made with United States government support awarded by the following agency: NSF Grant Nos: BCS-9109577; BES-9631962. The United States has certain rights to this invention.

FIELD OF THE INVENTION

The present invention relates to a process for producing kappa-casein macropeptides having nutraceutical properties. The present invention specifically relates to a process for producing kappa-casein macropeptides from cheese whey using two ion exchangers of opposite polarity in series.

BIBLIOGRAPHY

Complete bibliographic citations of the references referred to herein can be found in the Bibliography section, immediately preceding the claims.

BACKGROUND OF THE INVENTION

Nutraceuticals are foods that have specific medicinal as well as nutritional benefits. One nutraceutical, kappa-casein (κ-casein) macropeptide comprises 15–20% of the protein in whey, making its supply plentiful. Widely differing extents of glycosylation of κ-casein macropeptide (CMP) exist in whey and whey products, ranging from fully-glycosylated CMP (called κ-casein glycomacropeptide, or GMP) to non-glycosylated CMP. For purposes of the present invention, CMP includes all forms of the κ-casein macropeptide from the fully-glycosylated κ-casein glycomacropeptide to the non-glycosylated κ-casein glycomacropeptide. As discussed by Shammet et al. (1992), total CMP, which includes all degrees of glycosylation, is measured as non-protein nitrogen (NPN-2) soluble in 2% trichloroacetic acid (TCA). GMP is measured as non-protein nitrogen soluble in 12% TCA (NPN-12). The difference between NPN-2 and NPN-12 is non-glycosylated CMP.

CMP is the moiety cleaved from κ-casein at the $Phe^{105}$-$Met^{106}$ position by chymosin during cheese making (Dalgleish, 1982; Fox, 1989). CMP occurs at a concentration of 1.2 to 1.5 g/L in sweet whey (Cheddar cheese whey), comprising 15 to 20% of the total protein (Marshall, 1991). Kawaski et al. reviewed known biological functions of GMP as consolidated from several nutritional and biological research reports (U.S. Pat. No. 5,278,288 to Kawaski and Dosako; Kawaski et al., 1992), and Tanimoto et al. (1992) suggested the utilization of GMP in dietetic foods and pharmaceuticals. The advantage of CMP as a substrate for hydrolysis is that it does not contain the amino acids tyrosine, phenylalanine, and tryptophan. These are hydrophobic aromatic amino acids which make peptides bitter. Alternatively, Marshall (1991) suggested that CMP can be used as a protein source for the treatment of phenylketonuria, a hereditary disorder in which aromatic amino acids cannot be metabolized.

On a laboratory scale, CMP has been purified from κ-casein in bovine whey using TCA precipitation (Shammet et al., 1992). GMP has been purified from bovine whey by alcohol precipitation after heat coagulation of whey protein (Saito et al., 1991). These methods are unlikely to be economical for large-scale manufacturing.

On a large scale, several methods have been developed using ultrafiltration (Kawakami et al., 1992; Kawaski et al., 1993; Tanimoto et al., 1990) and ion exchange (U.S. Pat. No. 5,278,288 to Kawaski and Dosako; U.S. Pat. No. 5,290,107 to Kawaski et al.) to purify GMP from whey or whey protein concentrate. However, the recovery of GMP using these methods is uneconomically low, at most 18% (U.S. Pat. No. 5,278,288 to Kawaski and Dosako; U.S. Pat. No. 5,290,107 to Kawaski et al.). The basis of ultrafiltration purification is that the apparent molecular weight of GMP is 10 to 30 kDa at pH 3.5 and 20 to 50 kDa at pH 7.0. At pH 3.5, GMP permeates 20 to 50 kDa molecular weight cutoff (MWCO) ultrafiltration systems while proteins are retained by the membrane. Then at pH 6.5, GMP is retained by the same MWCO membranes while small molecular weight contaminants such as peptides pass through the filter.

U.S. Pat. Nos. 5,278,288 and 5,280,107 to Kawasaki et al. are specifically directed to GMPs. In the '288 patent, the GMP flows through a concentrating and desalting step unadsorbed. The '107 patent requires a pH value of about 4 or lower. Neither patent mentions the hydrolysis of GMP to form a solution depleted in aromatic amino acids, the presence of which causes bitterness. Neither patent mentions the use of two ion exchangers in series for the adsorption of GMP.

GMP contains substantial amounts of covalently bound sialic acids, which strongly determine the binding behavior in ion exchange separations. For example, the '107 patent to Kawasaki et al. discloses that because the sialic acids present in GMP have a pKa value of 2.7, these moieties have a net negative charge at pH as low as 3 to 4. In non-glycosylated CMP, the potentially negatively-charged amino acid side chains (aspartic and glutamic acid) have a pKa of 3 to 5, and would have a substantial net negative charge only at pH 5 and higher. The presence of sialic acids allowed Kawasaki et al. to separate GMP from proteins which lack sialic acids, by adsorbing the GMP to an anion exchanger at pH 4 or lower, because the other proteins are neutrally or positively charged at this pH. However, the method of Kawasaki et al. would not be suitable for recovering all of the CMP from whey because non-glycosylated CMP would not bind strongly to an anion exchanger until it had a substantial net negative charge, which would occur only at pH 5 or higher. Because some of the uses for CMP are based on the absence of aromatic amino acids, a characteristic of all CMP, methods specific for the recovery of only GMP would not be suitable for the full recovery of all CMP.

U.S. Pat. No. 5,075,424 to Tanimoto et al., U.S. Pat. No. 5,061,622 to Dosako et al., U.S. Pat. No. 5,216,129 to Berrocal et al. also describe processes for producing GMPs.

SUMMARY OF THE INVENTION

CMP is an example of a purified whey protein that has unique medical or health benefits not found with other proteins. Developing a technology for fractionation of CMP from whey will allow production of a high-value nutraceutical product from whey.

The present invention is directed to a process for producing CMP from whey comprising fractionating the whey by passing the whey over a first ion exchanger to yield a first CMP fraction, and fractionating the first fraction by passing the first fraction over a second ion exchanger, wherein the second ion exchanger has an opposite charge to the first ion exchanger to yield a CMP product.

The present invention is also directed to a process for producing CMP which comprises adjusting whey to a pH less than about 4, fractionating the adjusted whey by passing it over a cation exchanger to yield a first CMP fraction, fractionating the first fraction by passing it over an anion exchanger to yield a second adsorbed CMP fraction, and then eluting the second fraction to obtain substantially purified κ-casein macropeptide.

The present invention is further directed to a process for producing CMP from whey which comprises adjusting the whey to a pH greater than about 5, fractionating the adjusted whey by passing it over an anion exchanger to adsorb a first CMP fraction, then eluting the first adsorbed fraction and adjusting the eluted product to a pH less than about 4, and then fractionating the eluted product by passing the pH adjusted eluted product over a cation exchanger to adsorb protein contaminants, and then collecting the unadsorbed fraction to obtain the CMP.

The present invention is also directed to a hydrolyzed CMP nutraceutical food product wherein the amino acid residue content of the product is less than about 4% by total weight phenylalanine, tryptophan and tyrosine residues.

The invention is further directed to a method for the hydrolysis of the purified CMP.

There is a growing high value-added market for hydrolyzed whey proteins for foods for infants, geriatrics, individuals with allergic reactions to particular compounds, and individuals with enzyme deficiency. This is the growing nutraceutical marketplace. However, the bitterness of hydrolysates limits their use and the removal of bitter peptides from the hydrolysate is expensive. The advantage of CMP as a substrate for hydrolysis is that it does not contain the hydrophobic amino acids tyrosine, phenylalanine, and tryptophan that make peptides bitter.

The present invention offers increased purity, lower cost, and increased throughput compared to existing processes, and a hydrolyzed, non-bitter nutrient solution for human consumption. It also produces a non-fat, low-lactose, high protein product for food use.

Although the U.S. market for high value, purified whey proteins is small at present, several factors indicate it will grow. Other major dairying countries are developing markets for these purified individual whey protein products. In the future, the food industry will demand proteins with higher nutritional and functional properties because of the trend towards foods with enhanced health benefits, lower fat content and lower lactose content.

The aims, objects, and advantages of the above-described multi-component value-added concentrate will become apparent upon a complete reading of the Detailed Description, drawings, and attached claims, below.

DETAILED DESCRIPTION OF INVENTION

Figure 1:
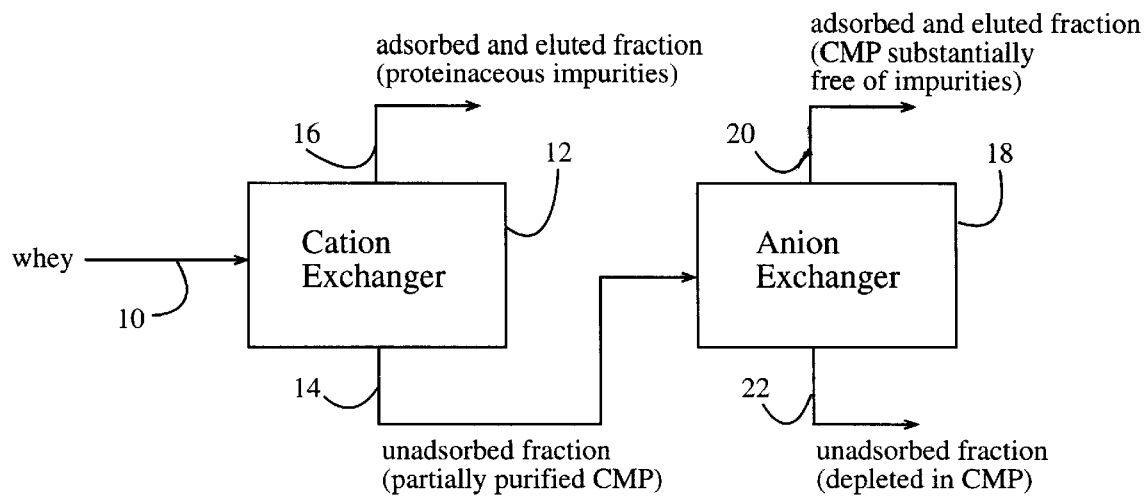
FIG. 1 depicts a flow chart illustrating the ion exchange method of the present invention wherein the first ion exchanger is a cation exchanger and the second ion exchanger is an anion exchanger.

The basis of this disclosure using the ion exchange method is that at a slightly acidic whey pH (greater than about 5) both non-glycosylated CMP and GMP have a substantial net negative charge, whereas some whey proteins and peptides are charged negatively and some are charged positively at this pH. At a lower whey pH (less than about 4), the whey proteins and peptides take on a positive charge, but non-glycosylated CMP loses its substantial net negative charge. Consequently, by contacting whey at acidic pH with only an anion exchanger, it is not possible to capture all of the CMP (GMP and non-glycosylated CMP) without also capturing some contaminating whey proteins and peptides. By contacting whey at acidic pH with only a cation exchanger, it is not possible to capture any CMP, although it is possible to capture all the proteins from the whey. Nevertheless, the unadsorbed fraction from the cation exchanger is only partially purified in CMP because it still contains peptide, lactose, mineral, fat, and other impurities present in whey. By using two ion exchangers, in an interchangeable sequence, each of opposite charge, a negatively-charged cation exchanger and a positively-charged anion exchanger, it is possible to separate CMP from impurities in whey to obtain purified CMP.

The following describes in detail the production of CMP for food and medical uses by the present invention.

I. Whey

Any kind of whey containing CMP may be used. Whey is defined as the thin, watery part of milk that separates from the thicker part (curds) after coagulation. The major dry-matter components in whey are lactose (approximately 75% on a total solids basis), protein (approximately 13%) and ash (approximately 9%). The ratio between the components changes depending on the process involved in its preparation. Examples of whey include cheese whey, rennet casein whey and products of these wheys such as whey protein concentrate and dried whey. Reconstitution of dried whey products with water is necessary before use. Furthermore, purified κ-casein, a milk product, may be substituted for milk to prepare whey containing CMP.

II. Clarifier

Small amounts of casein curds and lipids remain in these wheys, which are removed using a centrifuge, a cream separator or a clarifier prior to use, according to processes well known in the industry.

III. Adjust pH

The whey is then adjusted to about 6.5 or lower using an acid such as phosphoric acid, hydrochloric acid, sulfuric acid, acetic acid, lactic acid, and citric acid, according to methods known to the art.

IV. Filter

Following pH adjustment, the whey may be filtered to avoid plugging of the ion exchanger if a fine microporous membrane or column packed with fine beads is utilized. Filtering is not necessary when using ion exchange membranes having large pores or columns packed with beads of large diameter. Filtering is accomplished by means known to art, such as, for example, 0.7 μm filter paper (Micro Filtration Systems, Dublin, Calif.). One advantage of filtering is that it allows increasing the flow rate of whey and other solutions through the ion exchanger without a significant increase in pressure drop or loss of performance.

V. Heat

Advantageously, the process can be conducted at elevated temperatures, ranging from 35° C. to 60° C., preferably at a temperature of about 50° C. Increasing the temperature increases the efficiency of the separations by increasing the diffusion coefficient of the solutes and decreasing the viscosity of the fluid. This decreases mass transfer limitations to attaining equilibrium in the separations and decreases pressure drops and restrictions to attaining rapid fluid flow.

VI. Ion Exchanger

The basis of the ion exchange method is that both GMP and non-glycosylated CMP have a substantial net negative charge in whey at slightly acidic pH, whereas some whey proteins and peptides are charged negative and some are charged positive at this pH. At more acidic whey pH, the whey proteins and peptides take on a positive charge, and can be captured by a cation exchanger, whereas GMP and non-glycosylated CMP cannot be captured.

In the ion-exchange method, two ion exchangers are used, in an interchangeable sequence, each having an opposite charge, a negatively-charged cation exchanger and a positively-charged anion exchanger. By contacting the whey with two oppositely-charged ion exchangers, with a pH adjustment step in between contacting steps, the net charge on the CMP can be altered relative to the net charge on the impurities in at least one of the two ion exchange steps. The first ion exchanger can either be a cation exchanger or an anion exchanger. Then, the second ion exchanger must have a polarity opposite to the first ion exchanger. This section contains a description of the case where the first ion exchanger is a cation exchanger and the second ion exchanger is an anion exchanger.

Cation Then Anion Exchanger

Referring now to FIG. 1, when the first ion exchanger is a cation exchanger, the adjusted whey is contacted via line 10 with a cation exchanger 12 containing charged immobilized molecules such as carboxymethyl or sulfopropyl moieties. Examples of materials used to form the cross-linked polymeric beads used for the cation exchanger include cellulose, agarose, or dextran, each containing charged immobilized moieties. Microporous polymeric membranes comprised of regenerated cellulose, polysulfone, or cellulose acetate and containing the charged immobilized moieties are also contemplated here. A further example includes microporous paper containing the charged immobilized moieties.

Methods of contacting cation exchangers with whey are well known in the art. Conventional methods of contact are described in the following references which are incorporated herein by reference for their description of contacting methods (Ayers et al., 1986; Etzel, 1995; Adisaputro et al., 1996).

Two fractions are produced after contacting the cation exchanger with whey: whey containing compounds not adsorbed to the cation exchanger, i.e., the unadsorbed fraction with partially purified CMP through line 14, and the cation exchanger containing adsorbed compounds, i.e., adsorbed and eluted fraction or proteinaceous impurities through line 16.

The adsorbed compounds can be eluted by increasing the ionic strength or the pH. Elution may be accomplished using a volatile buffer such as ammonium acetate, which can vaporize during spray drying of the desorbed fraction, lowering the ash content of the dry product. Elution at pH 9 produces a whey protein isolate consisting of a mixture of the proteins in whey. Alternatively, elution at pH 6.5 desorbs whey protein isolate, but lactoferrin and lactoperoxidase remain adsorbed. These proteins can be desorbed at pH 9, or separately lactoperoxidase can be eluted using 0.3 M salt, followed by lactoferrin using 0.9 M salt.

The fraction consisting of whey containing the desired CMP is contacted with an anion exchanger 18 via line 14, using materials and methods similar to the above description, to capture the CMP. The anion exchanger 18 contains charged immobilized molecules such as diethylaminoethyl or quaternary amine moieties. Commercially available anion exchangers and methods of contacting anion exchangers 18 with whey are well known in the art. The whey may first be adjusted to a pH greater than about 4 using an alkali such as sodium hydroxide, potassium hydroxide, and ammonia.

The adsorbed and eluted fraction of CMP (substantially free of impurities) can be eluted from the anion exchanger via line 20 by increasing the ionic strength or decreasing the pH. Elution may be accomplished using a volatile buffer as described above. The unadsorbed fraction, depleted in CMP, is removed from the anion exchanger 18 via line 22.

In the process of the production of whey protein isolate, a by-product is produced that can be used directly in the contacting step with an anion exchanger and subsequent steps or in the contacting step with a cation exchanger and subsequent steps. The by-product is produced when whey or whey products are contacted with a cation exchanger to adsorb whey proteins (Ayers et al., 1986). The whey proteins can be eluted from the cation exchanger for sale as whey protein isolates.

The whey containing the unadsorbed components is a by-product stream rich in κ-casein macropeptide, an anion that does not adsorb to the cation exchanger.

Anion Then Cation Exchanger

Figure 2:
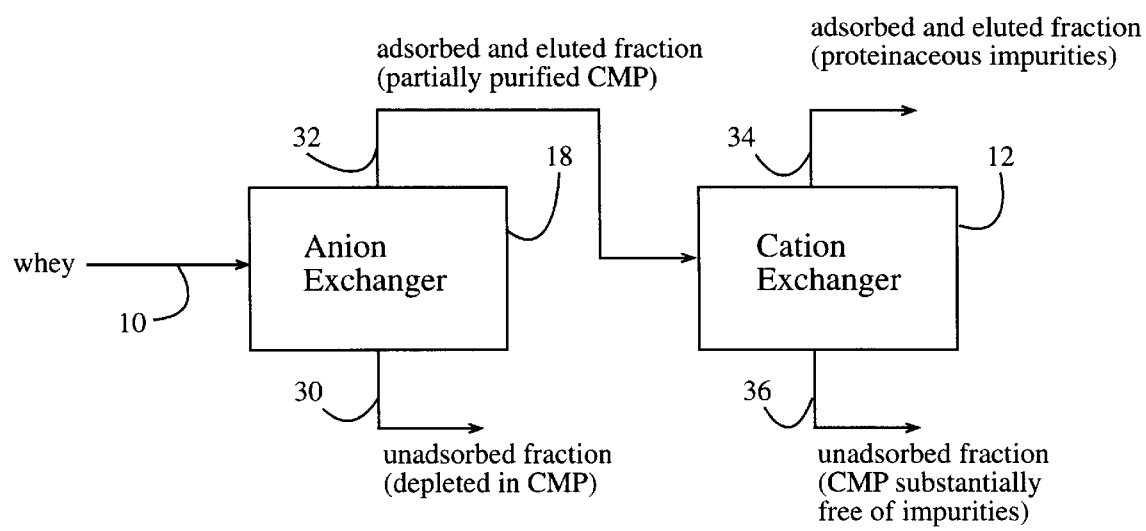
FIG. 2 depicts a flow chart illustrating the ion exchange method of the present invention wherein the first ion exchanger is an anion exchanger and the second ion exchanger is a cation exchanger.

Referring now to FIG. 2, this section contains a description of the reverse case wherein the first ion exchanger is an anion exchanger and the second ion exchanger is a cation exchanger.

When the first ion exchanger is an anion exchanger, the adjusted whey is contacted via line 10 with an anion exchanger 18 containing charged immobilized molecules such as diethylaminoethyl or quaternary amine moieties. Examples of materials used to form the ion exchanger, and methods of contacting ion exchangers with whey have been discussed above.

Two fractions are produced after contacting the anion exchanger 18 with whey: whey containing compounds not adsorbed to the anion exchanger via line 30 and the anion exchanger containing adsorbed compounds, i.e., adsorbed and eluted fraction or partially purified CMP, via line 32.

The fraction consisting of whey containing the unadsorbed compounds contains the bulk of the whey proteins, lactose, minerals, and peptides. It can be used to make a whey protein concentrate that is depleted in CMP.

The adsorbed compounds are partially purified in CMP, and can be eluted by increasing the ionic strength or decreasing the pH. Elution may be accomplished using a volatile buffer as described above. Elution using 0.3M salt has been found to work well.

The eluted fraction is contacted via line 32 with a cation exchanger 12 containing charged immobilized molecules such as carboxymethyl or sulfopropyl moieties, using materials and methods similar to the above description. The whey may first be adjusted to a pH less than about 4 using an acid such as phosphoric acid, hydrochloric acid, sulfuric acid, acetic acid, lactic acid, and citric acid. The cation exchanger step is to remove proteinaceous impurities from the CMP via line 34. The CMP does not adsorb to the cation exchanger and is wholly contained in the fraction containing the unadsorbed compounds via line 36. Methods of contacting cation exchangers with whey are well known in the art. Conventional methods of contact are described in Adisaputro et al. 1996.

In the process of the production of whey protein isolate, a by-product is produced that can be used directly in the contacting step with the anion exchanger and subsequent steps. The by-product is produced when whey or whey products are contacted with a cation exchanger to adsorb whey proteins (Ayers et al., 1986). The whey proteins can be eluted from the cation exchanger for sale as whey protein isolates. The whey containing the unadsorbed components is a by-product stream rich in CMP, an anion that does not adsorb to the cation exchanger. This by-product can be used instead of whey.

VII. Adsorbent

The fraction containing CMP thus obtained is substantially free of impurities, but may be further purified by contacting the fraction with one or more adsorbents to remove residual peptide or protein contaminants. The adsorbent or adsorbents may consist of activated carbon, hydrophobic moieties, and metal chelate affinity moieties. Hydrophobic interaction matrices such as immobilized butyl, phenyl, and octyl moieties, and activated carbon may be used to adsorb peptide and protein contaminants containing hydrophobic amino acids such as phenylalanine, tryptophan, and tyrosine. Other whey proteins and peptide hydrolysis products of caseins and whey proteins contain these amino acids whereas CMP does not. Therefore, by contacting the fraction containing CMP with an adsorbent such as hydrophobic interaction matrices and activated carbon, peptide and protein contaminants can be removed by adsorption, enriching the fraction in CMP.

Metal chelate matrices consist of immobilized metal ions that bind to protein and peptide contaminants containing surface histidine and cysteine amino acid residues at around pH 6–8. Other whey proteins and peptide hydrolysis products of caseins and whey proteins contain these amino acids whereas CMP does not. Therefore, by contacting the fraction containing CMP with a metal chelate adsorbent, peptide and protein contaminants are removed by adsorption, purifying the fraction in CMP. For the chelating group and metal ion, iminodiacetic acid and $Cu^{2+}$, $Zn^{2+}$, $Ni^{2+}$, $Ca^{2+}$, $Co^{2+}$, and $Mg^{2+}$, respectively, may be exemplified. The materials and methods described above may be used for the immobilization matrix and contacting procedures for removal of peptide or protein contaminants.

VIII. Hudrolysis

The purified CMP may be hydrolyzed to form a food product having special medical and health benefits. Hydrolysis is the chemical reaction in which the amino acid chain of the protein reacts with water so as to be split into smaller molecular weight peptides and amino acids. Hydrolysis can be conducted by the use of acids (acid hydrolysis), alkalis (alkaline hydrolysis) or enzymes (enzyme hydrolysis). The use of enzymes is preferred. Examples of enzymes used for hydrolysis include alkaline, neutral, and acid proteases having endoprotease and exoprotease specificity; exopeptidases such as carboxypeptidase and aminopeptidase; and endopeptidases such as subtilisin. The enzyme may be contacted with the purified CMP in a batch reactor or a flow reactor. In a flow reactor, the enzyme may be immobilized to the same matrices as discussed above i.e. beads, microporous membranes, and microporous papers.

Hydrolysis reactions are generally carried out over a temperature and pH range of from about 120° F.–140° F. (49° C.–60° C.) and from about 4.0 to 6.0, respectively. Hydrolysis reaction times usually range between about 2 to 8 hours.

EXAMPLES

In order to more fully illustrate the present invention, the following Examples are provided. The Examples, which make reference to the attached Figures, are for illustration purposes only, to aid in a more complete understanding of the invention. The Examples do not limit the scope invention disclosed and claimed herein in any fashion.

Example 1

Partially defatted (by centrifugation) unpasteurized Cheddar cheese whey at pH 6.2–6.4, made from pasteurized milk, was adjusted to pH 3.0 by addition of 2.0 M HCl. The whey was vacuum-filtered through a 0.7-$\mu$m glass filter and stored at 4° C. An aliquot of whey (5.8 L) was pumped at 80 mL/min through a 50-mm diameter water-jacketed (50° C.) chromatography column (XK50/60), Pharmacia, Piscataway, N.J.) filled with 1,000 mL of cation exchange beads (GibcoCel SP HB2, Life Technologies, Gaithersburg, Md.). All solutions were thermally equilibrated to 50° C. before loading into the column using a Masterflex pump (Cole-Parmer Instrument Co., Chicago, Ill.). The column was washed with deionized water (1,500 mL) and eluted using 0.2 M $NH_4Cl$ pH 9.0 (4,500 mL). An aliquot (40 mL) of the effluent whey solution from the column was adjusted to pH 5.0 using 1 M NaOH and passed at 15 mL/min through a stack of 10 47-mm disks of anion exchange filter paper (DE81, Whatman, Fairfield, N.J.) at 22° C. The disks were washed with deionized water and then eluted using 0.3 M NaCl.

The samples were analyzed by SDS-PAGE and by size-exclusion HPLC at detection wavelengths of 214 and 280 nm. At 214 nm, all amino acids absorb light and are detected. At 280 nm, only the aromatic amino acids (tyrosine and tryptophan) absorb light. Because CMP does not contain aromatic amino acids, it will not be detected at 280 nm. Only proteinaceous impurities are detected at 280 nm.

From a calibration of the HPLC column, a plot of $\log_{10}$ molecular weight (kDa) vs. retention time (RT) in minutes had a slope of −0.43±0.02 and a y-intercept of 5.4±0.2. Consequently, the four major whey proteins would have the following RTs: $\alpha$-lactalbumin (14 kDa)=10±1 min, $\beta$-lactoglobulin dimer (37 kDa)=9±1 min, serum albumin (67 kDa)=8±1 min, and immunoglobulins (>150 kDa)<7.5 min. GMP (C 7278, Sigma) had a RT of 8 to 9 min, and was detectable at 214 nm, but not at 280 nm.

Figures 3A, 3B, 3C:
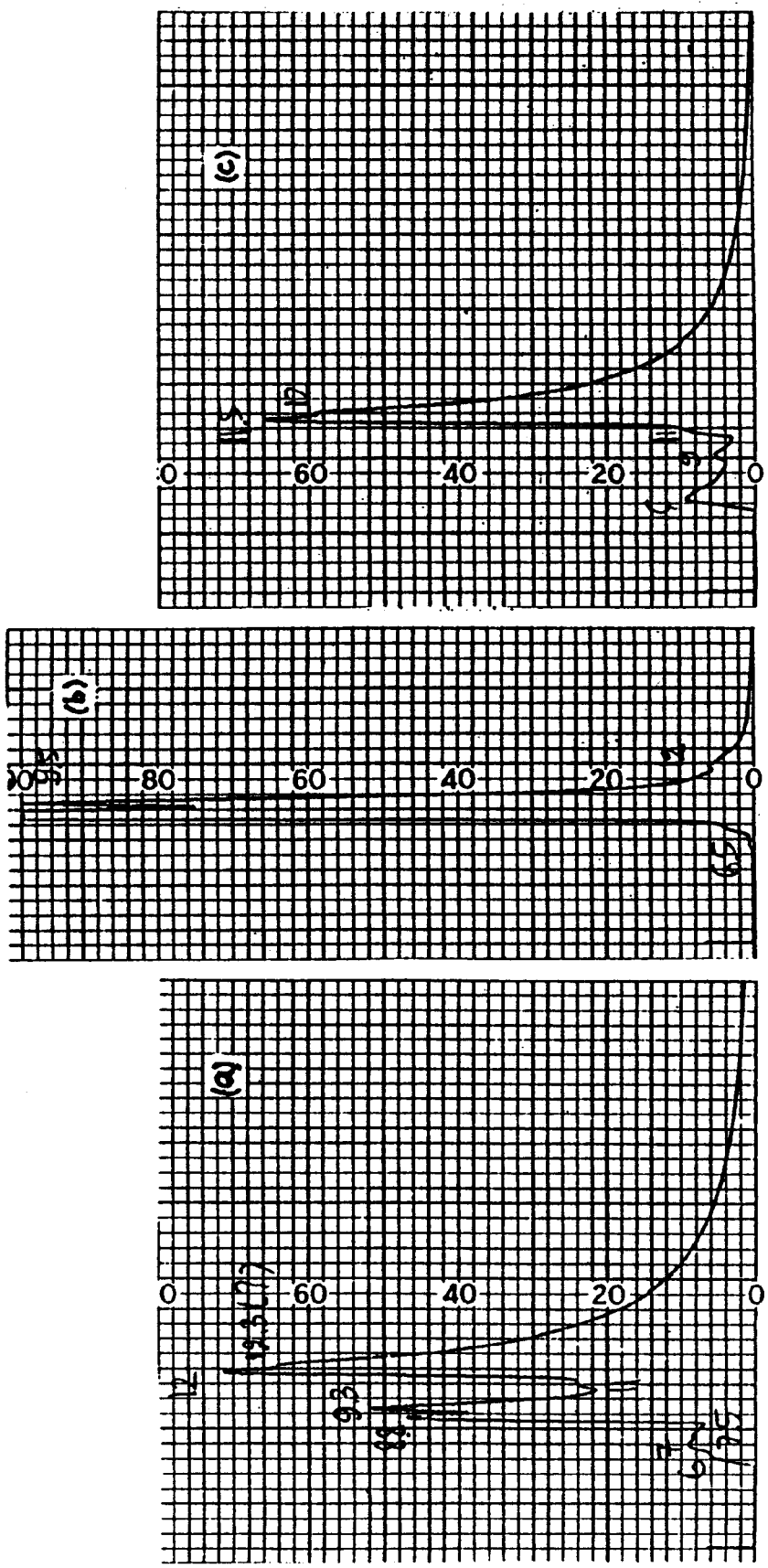
FIG. 3a depicts an HPLC chromatogram at 280 nm (sensitivity—0.05) for a whey sample in the first ion exchanger in Example 1. One division of the x-axis equals one minute.
FIG. 3b depicts an HPLC chromatogram at 280 nm (sensitivity—0.05) of an elution peak for the first ion exchanger in Example 1. One division of the x-axis equals one minute.
FIG. 3c depicts an HPLC chromatogram at 280 nm (sensitivity—0.05) for the effluent sample in the first ion exchanger in Example 1. One division of the x-axis equals one minute.
Figures 3D, 3E:
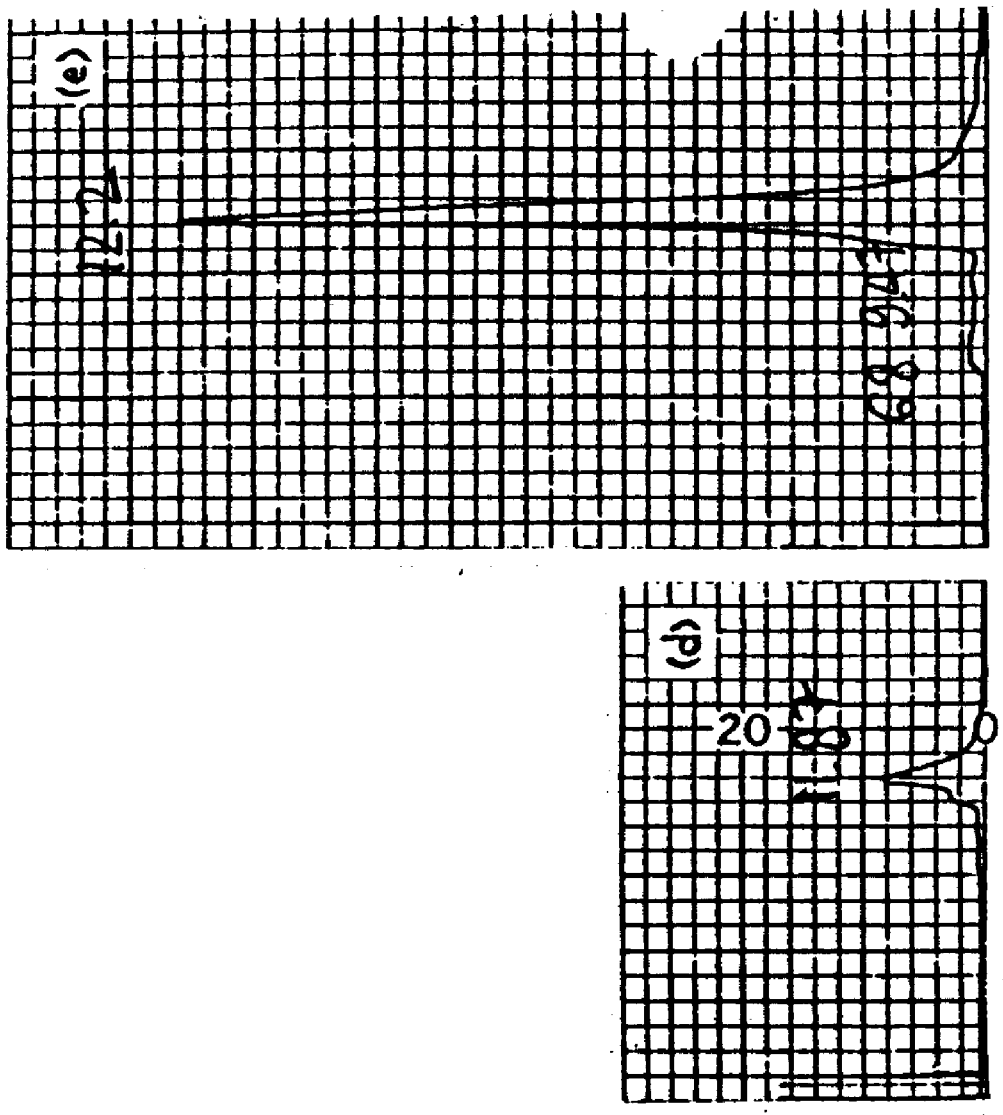
FIG. 3d depicts an HPLC chromatogram at 280 nm (sensitivity—0.05) for the elution peak in the second ion exchanger in Example 1. One division of the x-axis equals one minute.
FIG. 3e depicts an HPLC chromatogram at 280 nm (sensitivity—0.05) for for the effluent sample in the second ion exchanger in Example 1. One division of the x-axis equals one minute.

From the HPLC chromatograms at 280 nm (FIG. 3), whey [FIG. 3a] contained proteins i.e. peaks with RTs of 6 to 10 min, and peptides with RTs of greater than 11 min. The peptides had a molecular weight of less than about 4 kDa. The elution peak [FIG. 3b] from the cation exchanger, the first ion exchanger, contained the major whey proteins and essentially no peptides, as determined by the absence of peaks with RTs>11 min, whereas the effluent [FIG. 3c], the first CMP fraction, contained the peptides and trace amounts of the major whey proteins.

Figure 4:
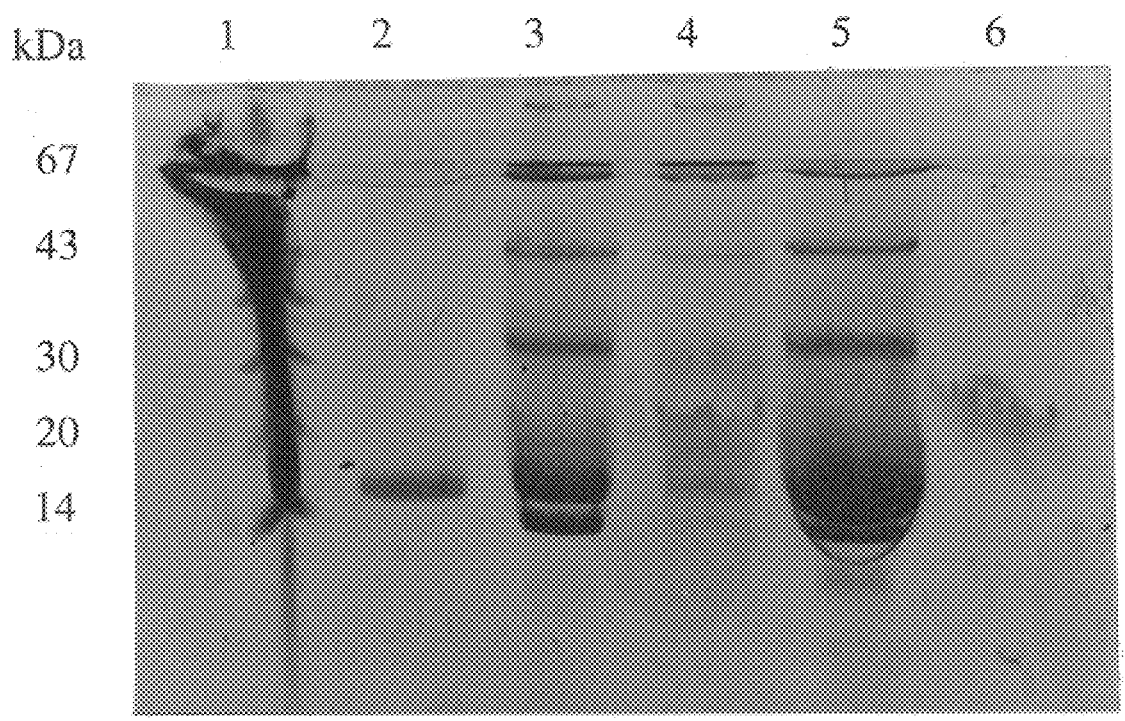
FIG. 4 is an SDS-PAGE analysis of the samples from the first ion exchanger in Example 1. Lane 1=molecular weight markers, Lane 2=β-lactoglobulin, Lane 3=whey, Lane 4=effluent, Lane 5=elution peak, and Lane 6=Sigma GMP.

By SDS-PAGE analysis (FIG. 4), the elution peak (Lane 5) from the cation exchanger contained the major whey proteins, but no CMP. Although CMP did not stain as intensely as the major whey proteins, an unusual fingering pattern in the CMP band simplified detection.

Figure 5A:
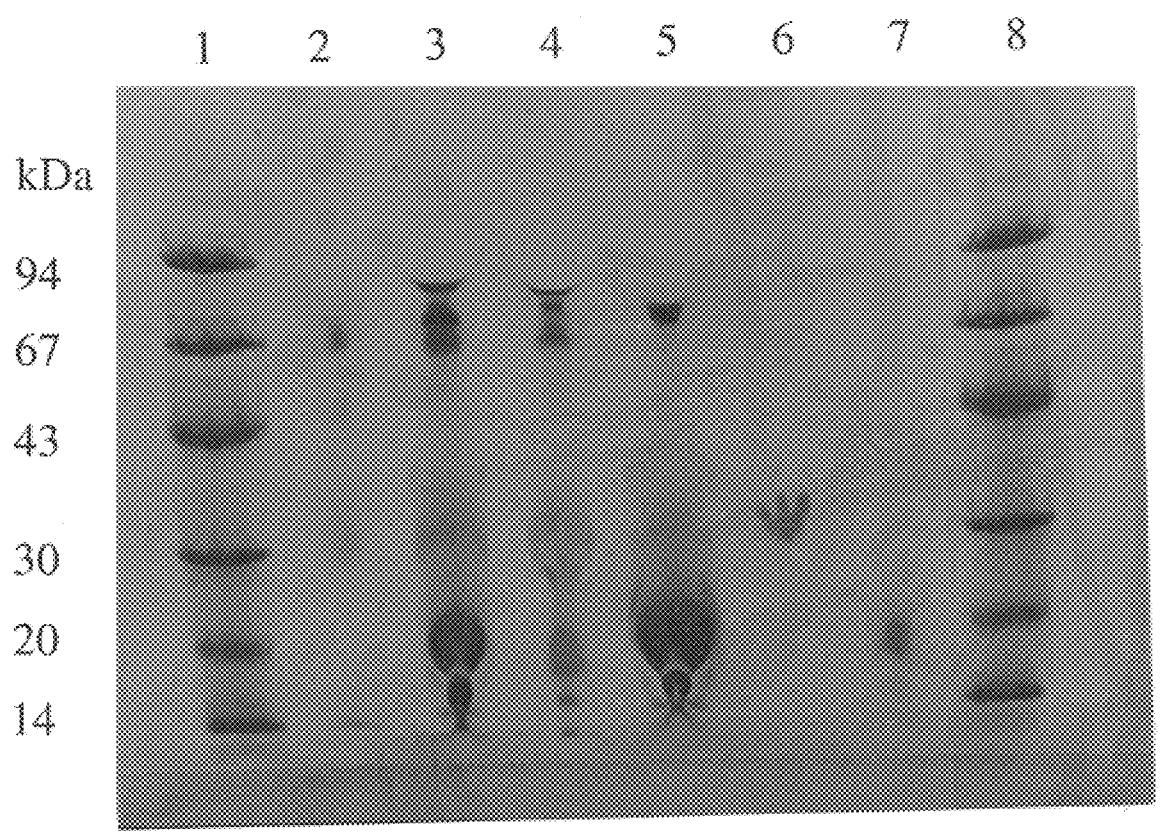
FIG. 5a is an SDS-PAGE analysis of the samples from the first ion exchanger in Example 1 before precipitation of proteins by 6% trichloroacetic acid. Lane 1=molecular weight markers, Lane 2=immunoglobulin G, Lane 3=whey, Lane 4=effluent, Lane 5=elution peak, Lane 6=Sigma GMP, Lane 7=β-lactoglobulin, and lane 8=molecular weight markers.
Figure 5B:
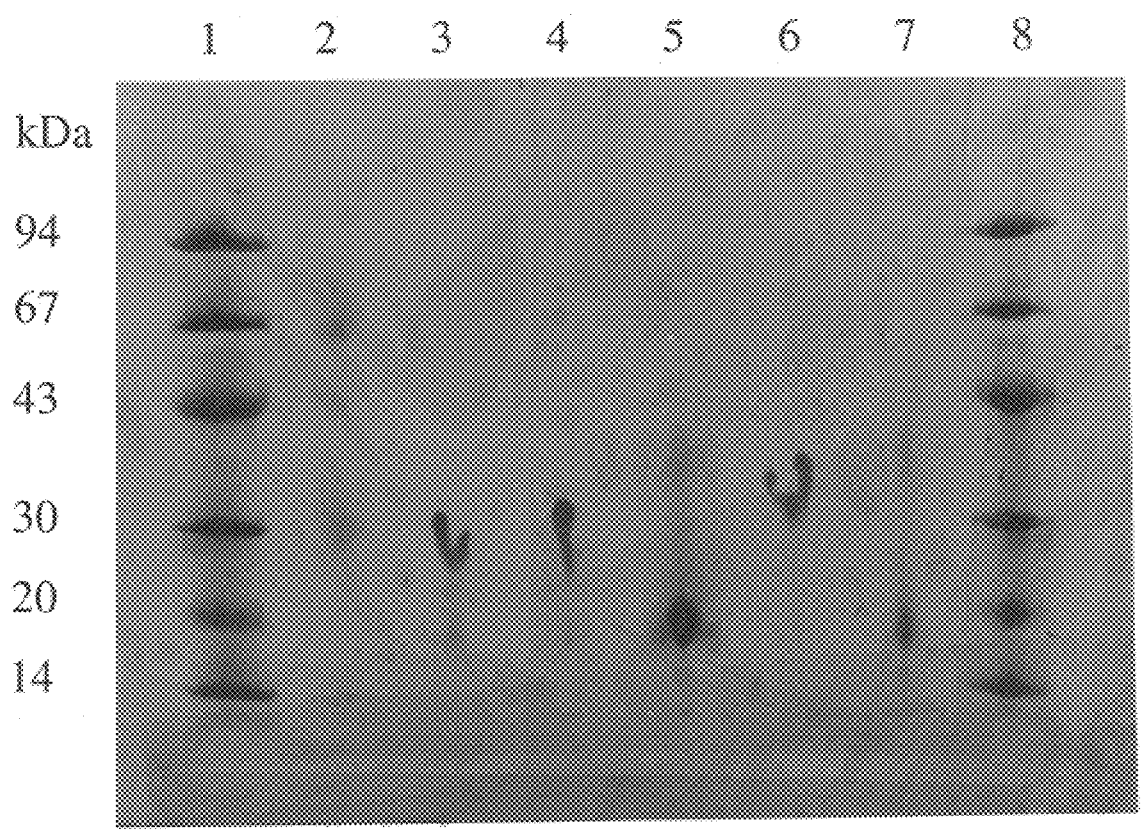
FIG. 5b is an SDS-PAGE analysis of the samples from the first ion exchanger in Example 1 after precipitation of proteins by 6% trichloroacetic acid. Lane 1=molecular weight markers, Lane 2=immunoglobulin G, Lane 3=whey, Lane 4=effluent, Lane 5=elution peak, Lane 6=Sigma GMP, Lane 7=β-lactoglobulin, and lane 8=molecular weight markers.

The presence of CMP was confirmed by SDS-PAGE analysis (FIG. 5) of the samples before and after precipitation of the proteins by 6% trichloroacetic acid. The elution peak (Lane 5) contained no CMP. The first CMP fraction contained all the CMP along with trace amounts of the major whey proteins.

The first CMP fraction was adjusted to pH 5.0 and loaded into a second ion exchanger, a stack of anion exchange paper. From the HPLC chromatograms at 280 nm, the elution peak from the second ion exchanger [FIG. 3d] was substantially free of protein and peptide impurities compared to the feed solution [FIG. 3c], because these components passed through without binding and into the effluent [FIG. 3e].

Figure 6:
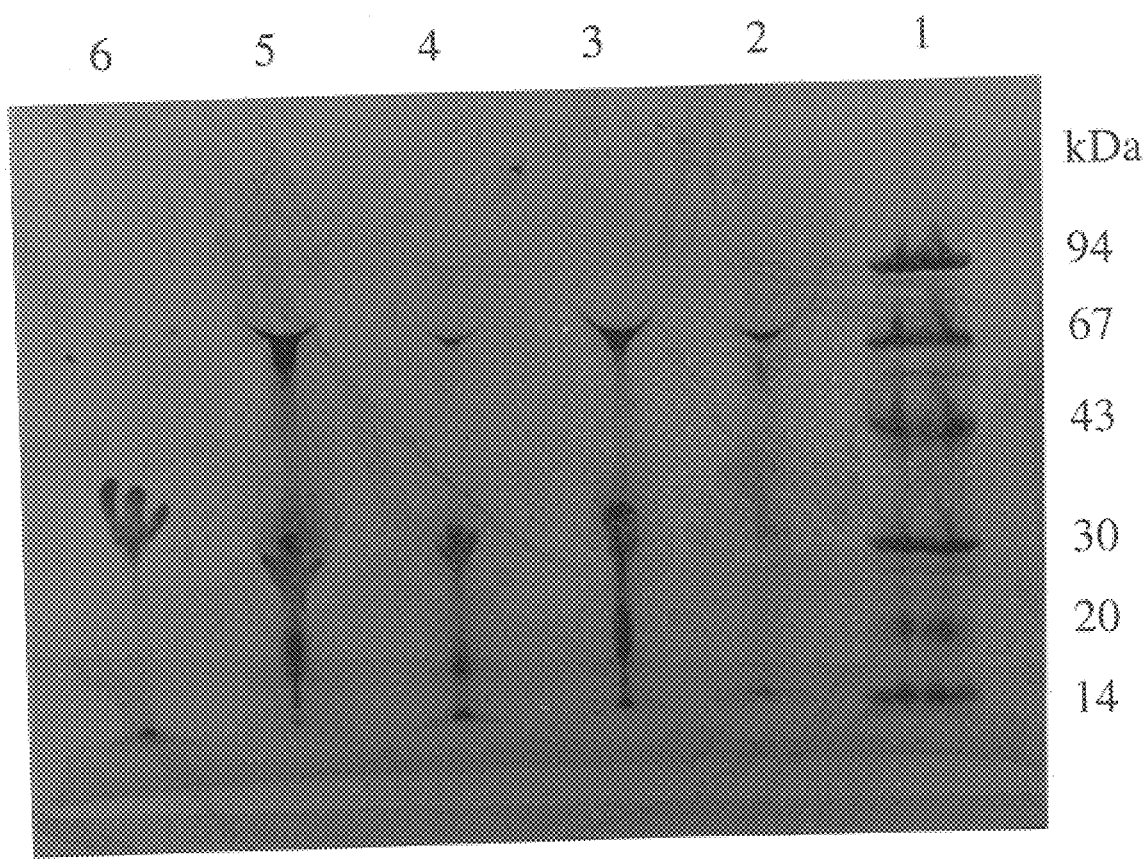
FIG. 6 is an SDS-PAGE analysis of the samples from the second ion exchanger in Example 1. Lane 1=molecular weight markers, Lane 2=immunoglobulin G, Lane 3=the first CMP fraction, Lane 4=elution peak, Lane 5=effluent and Lane 6=Sigma GMP.

From SDS-PAGE analysis (FIG. 6), the first fraction was contaminated with trace amounts of whey proteins, in agreement with the HPLC results, and the elution peak from the second exchanger was CMP, substantially free of proteinaceous impurities.

Example 2

Whey, prepared as described in Example 1, was adjusted to pH 5.0 by addition of 1 M HCl. The whey was vacuum-filtered through a 0.7-$\mu$m glass filter and stored at 4° C. An aliquot (40 mL) of whey was pumped at 1.5 mL/min through a stack of 10 47-mm disks of anion exchange filter paper (DE81) at 22° C. The disks were washed with deionized water and eluted using 0.3 M NaCl. The elution peak was adjusted to pH 3.0 using 1 M HCl and passed by gravity flow through a chromatography column (Econo-Pac, Bio-Rad Laboratories, Hercules, Calif.) containing 10 mL of cation exchange beads (GibcoCel SP HB5, Life Technologies, Gaithersburg, Md.). The column was washed with water and eluted using 0.2 M $NH_4Cl$ pH 9.0.

Figures 7A, 7B, 7C, 7D:
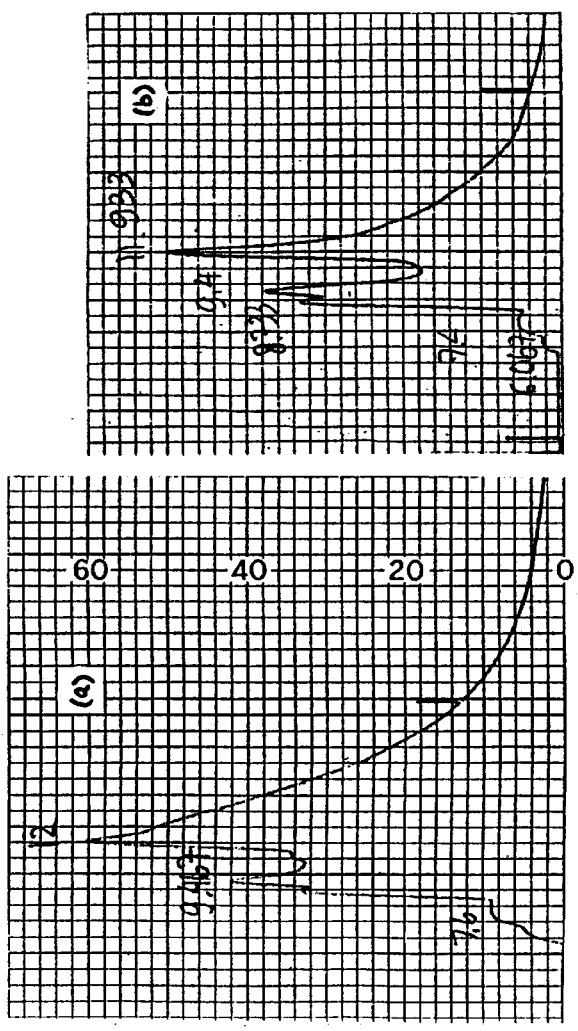
FIG. 7a depicts an HPLC chromatogram at 280 nm (sensitivity—0.05) for whey samples from the first ion exchanger in Example 2. One division of the x-axis equals one minute.
FIG. 7b depicts an HPLC chromatogram at 280 nm (sensitivity—0.05) for effluent samples from the first ion exchanger in Example 2. One division of the x-axis equals one minute.
FIG. 7c depicts an HPLC chromatogram at 280 nm (sensitivity—0.05) for the first CMP fraction from the first ion exchanger in Example 2. One division of the x-axis equals one minute.
FIG. 7d depicts an HPLC chromatogram at 280 nm (sensitivity—0.05) for the effluent sample from the second ion exchanger in Example 2. One division of the x-axis equals one minute.

From the HPLC chromatograms at 280 nm (FIG. 7), whey [FIG. 7a] contained peptides and the major whey proteins. The effluent [FIG. 7b] from the first ion exchanger (the anion exchanger) contained nearly all the peptides and major whey proteins. The elution peak [FIG. 7c], the first CMP fraction, contained trace amounts of both peptides and major whey proteins.

Figures 8A, 8B, 8C, 8D, 8E:
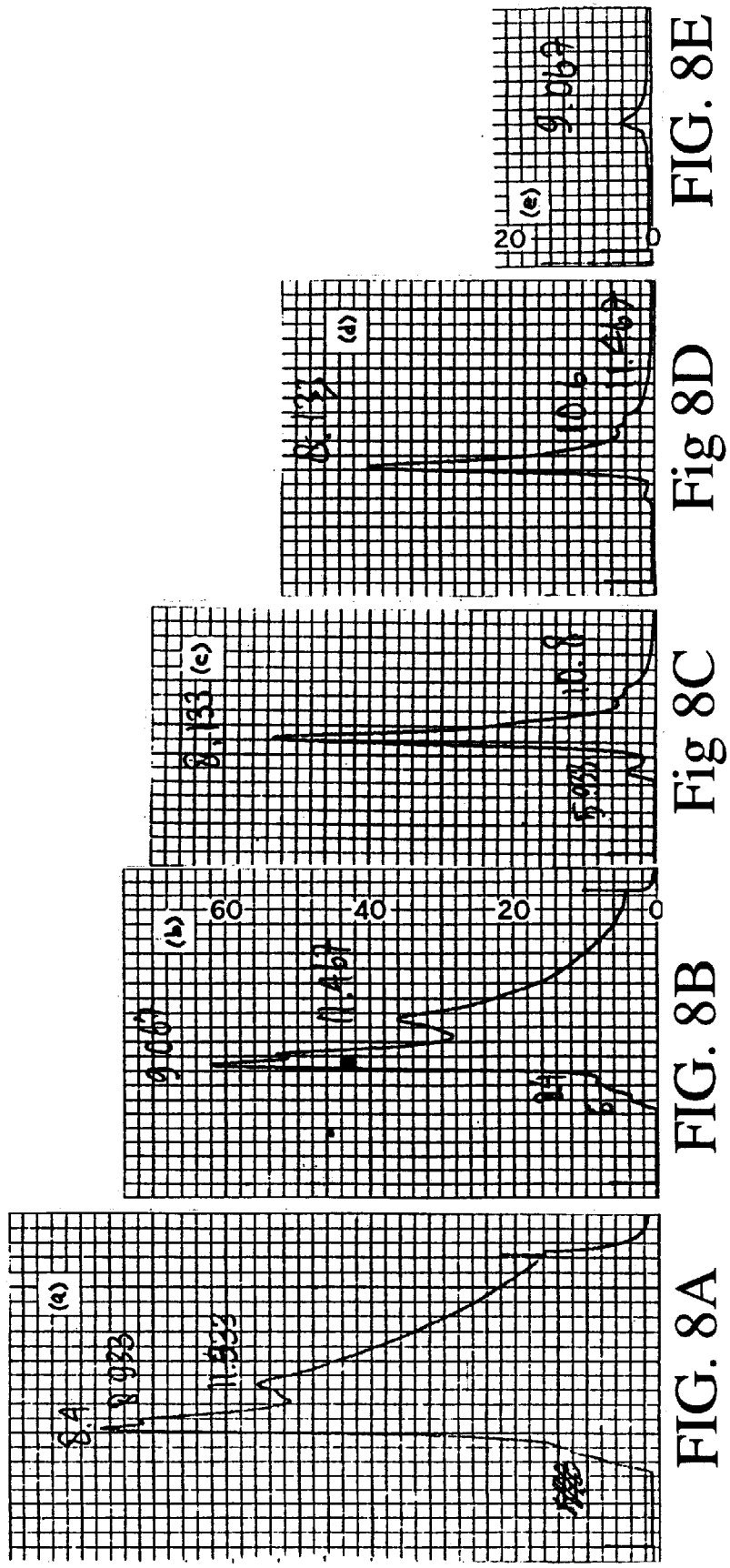
FIG. 8a depicts an HPLC chromatogram at 214 nm (sensitivity—0.5) for the whey samples from the first ion exchanger in Example 2. One division of the x-axis equals one minute.
FIG. 8b depicts an HPLC chromatogram at 214 nm (sensitivity—0.5) for the effluent samples from the first ion exchanger in Example 2. One division of the x-axis equals one minute.
FIG. 8c depicts an HPLC chromatogram at 214 nm (sensitivity—0.5) for for the first CMP fraction from the first ion exchanger in Example 2. One division of the x-axis equals one minute.
FIG. 8d depicts an HPLC chromatogram at 214 nm (sensitivity—0.5) for the effluent samples from the second ion exchanger in Example 2. One division of the x-axis equals one minute.
FIG. 8e depicts an HPLC chromatogram at 214 nm (sensitivity—0.5) for elution peak from the second ion exchanger in Example 2. One division of the x-axis equals one minute.

In confirmation, from the HPLC chromatograms at 214 nm (FIG. 8), nearly all the peptides and the major whey proteins in the whey [FIG. 8a] passed through the anion exchanger to the effluent [FIG. 8b]. The first CMP fraction [FIG. 8c] contained trace amounts of both the peptides and major whey proteins, and a large peak at 8 min, which probably was primarily CMP, because this fraction contained small amounts of protein based on the chromatogram at 280 nm.

Figure 9:
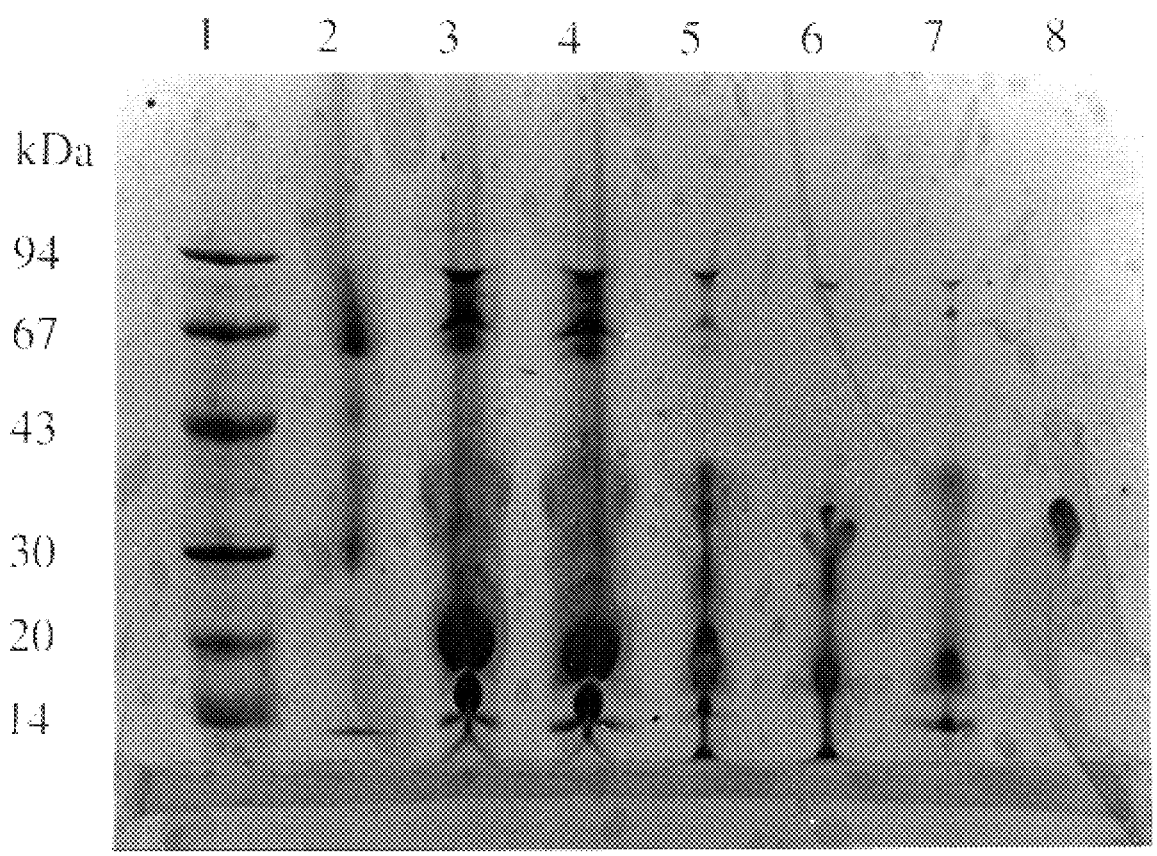
FIG. 9 is an SDS-PAGE analysis of the samples in Example 2. Lane 1=molecular weight markers, Lane 2=immunoglobulin G, Lane 3=whey, Lane 4=effluent from the first ion exchanger, Lane 5=the first CMP fraction, Lane 6=effluent from the second ion exchanger, Lane 7=elution peak from the second ion exchanger, Lane 8=Sigma GMP.

By SDS-Page analysis (FIG. 9), the effluent from the anion exchanger (Lane 4) contained nearly all the major whey proteins. The first CMP fraction (Lane 5) contained trace amounts of the major whey proteins, and a CMP band.

The first CMP fraction was adjusted to pH 3.0 and loaded into the second ion exchanger, a column containing cation exchange beads. From the HPLC chromatogram at 280 nm, the effluent [FIG. 7d] from the second ion exchanger contained the majority of the peptides but was substantially free of protein impurities that had been present in the first CMP fraction.

In agreement, from the HPLC chromatograms at 214 nm, the effluent [FIG. 8d] contained primarily CMP and the majority of the peptides, but was substantially free of protein impurities. The elution peak [FIG. 8e] from the second ion exchanger contained a peak at 9 min, which was probably protein.

By SDS-PAGE analysis (FIG. 9) the effluent from the second ion exchanger (Lane 6) contained nearly all the CMP, and was substantially free of protein impurities. The elution peak (Lane 7) contained the major whey protein impurities (notably β-lactoglobulin), but no CMP.

It is understood that the invention is not confined to the particular construction and arrangement of parts herein illustrated and described, but embraces such modified forms thereof as come within the scope of the claims following the Bibliography.

BIBLIOGRAPHY

U.S. Pat. No. 5,061,622 to Dosako et al.
U.S. Pat. No. 5,075,424 to Tanimoto et al.
U.S. Pat. No. 5,216,129 to Berrocal et al.
U.S. Pat. No. 5,278,288 to Kawaski and Dosako.
U.S. Pat. No. 5,280,107 to Kawasaki et al.
Japanese Patent JP 2-27654 to Tanimoto, M. et al.

Adisaputro, I. A., et al., 1996, *J. Liq. Chrom. & Rel. Technol.*, 19(9) 1437–1450.

Ayers, J. S. et al., 1986, *New Zealand J. Dairy Sci. Technol.*, 21, 21–35.

Dalgleish, D. G., 1982,"The Enzymatic Coagulation of Milk," *Developments in Dairy Chemistry*-1 *Functional Milk Proteins*, (Edited by P. F. Fox), pp. 1–53, Applied Science Publishers, New York.

Etzel, M. R., 1995, "Whey Protein Isolation and Fractionation Using Ion Exchangers," *Bioseparation Processes in Foods*, R. K. Singh and S. S. H. Rizvi (eds.), Marcel Dekker, New York, Ch. 12.

Fox, P. F., 1989, "The Milk Protein System," *Developments in Dairy Chemistry*-4 *Functional Milk Proteins*, (Edited by P. F. Fox), pp 1–53. Elsevier Applied Science, New York.

Kawakami, H., et al., 1992, "Determination of κ-casein Glycomacropeptide by High Performance Liquid Chromatography Without Trichloroacetic Acid Pretreatment," *Milchwissenschaft* 47, 688–693.

Kawaski, Y., et al., 1993, "pH-Dependent Molecular Weight Changes of κ-casein Glycomacropeptide and its Preparation by Ultrafiltration," *Milchwissenschaft* 48, 191–195.

Marshall, S. C., 1991, "Casein Macropeptide From Whey—A New Product Opportunity. *Food Research Quarterly* 51, 86–89.

Saito, T., et al., 1991, "A New Isolation Method of Casein Glycopeptide from Sweet Cheese Whey." *Journal of Dairy Science*, 74, 2831–2837.

Shammet et al., 1992, "Characteristics of Macropeptide Fraction Isolation from Whole Casein and Purified κ-casein." *Milchwissenschaft* 47, 615–619.

Tanimoto, M. et al., 1992, "Large-Scale Preparation of κ-casein Glycomacropeptide from Rennet Casein Whey," *Bioscience, Biotechnology and Biochemistry*, 56, 140–141.

What is claimed is:

1. A process for producing κ-casein macropeptide from whey comprising:

a. fractionating the whey by contacting the whey with a first ion exchanger to yield a first κ-casein macropeptide fraction; and then
   b. fractionating the first fraction by contacting the first fraction with a second ion exchanger, wherein the second ion exchanger consists of an ion exchange medium which has an opposite charge to the first ion exchanger to yield a κ-casein macropeptide product.

2. The process of claim 1 wherein the first ion exchanger is a cation exchanger, wherein proteinaceous impurities are adsorbed to the first ion exchanger as an absorbed fraction and partially purified κ-casein macropeptide passes through the first ion exchanger unadsorbed, and the second ion exchanger is an anion exchanger, wherein the κ-casein macropeptide product is adsorbed to the second ion exchanger.

3. The process of claim 2 wherein the anion exchanger comprises porous membranes containing charged immobilized moieties.

4. The process of claim 2 wherein the cation exchanger comprises porous membranes containing charged immobilized moieties.

5. The process of claim 2 comprising eluting the adsorbed fraction on the cation exchanger to produce a whey protein isolate.

6. The process of claim 1 wherein the first ion exchanger is an anion exchanger, wherein partially purified κ-casein macropeptide is adsorbed to the first ion exchanger, eluted therefrom, and then contacted with the second ion exchanger, and the second ion exchanger is a cation exchanger, wherein the purified κ-casein macropeptide product passes through the second ion exchanger unadsorbed.

7. The process of claim 6 wherein the anion exchanger comprises porous membranes containing charged immobilized moieties.

8. The process of claim 6 wherein the cation exchanger comprises porous membranes containing charged immobilized moieties.

9. The process according to claim 2 comprising adjusting whey to a pH less than about 4.

10. The process according to claim 1 further comprising, after steps (a) and (b):

c. removing residual protein or peptide impurities from the κ-casein macropeptide product by contacting the product with an adsorbent.

11. The process according to claim 10 wherein the adsorbent is selected from the group consisting of activated carbon, hydrophobic interaction matrices, metal affinity, and cation exchange moieties.

12. The process of claim 1 further comprising hydrolyzing the amino acid chain of κ-casein macropeptide product.

13. The process according to claim 12 wherein the hydrolysis is caused by enzymes.

14. The process of claim 1 conducted at a temperature of about 50° C.

15. A process for producing κ-casein macropeptide which comprises:

a. adjusting whey to a pH less than about 4;
    b. fractionating the adjusted whey by contacting the whey with a cation exchanger wherein proteinaceous impurities are adsorbed to the cation exchanger and partially purified κ-casein macropeptide passes through the cation exchanger unadsorbed to yield a first κ-casein macropeptide fraction;
    c. adjusting the first fraction of step (b) to a pH greater than about 4;

d. fractionating a first fraction of step (c) by contacting the first fraction with an anion exchanger wherein κ-casein macropeptide is adsorbed to the anion exchanger to yield a second adsorbed κ-casein macropeptide fraction; and e. eluting the second adsorbed κ-casein macropeptide fraction to obtain substantially purified κ-casein macropeptide.

16. The process according to claim 15, further comprising after step (e):

f. contacting the substantially purified κ-casein macropeptide with an adsorbent to remove residual protein or peptide impurities therefrom.

17. The process according to claim 16 wherein the adsorbent is selected from the group consisting of activated carbon, hydrophobic interaction matrices, metal affinity, and cation exchange moieties.

18. The process of claim 15 further comprising hydrolyzing the substantially purified κ-casein macropeptide to form a nutraceutical food product.

19. The process according to claim 18 wherein substantially purified κ-casein macropeptide is hydrolyzed enzymatically.

20. The process of claim 15 conducted at a temperature of about 50° C.

21. A process for producing κ-casein macropeptide from whey which comprises:

a. adjusting the whey to a pH greater than about 4;

b. fractionating the adjusted whey by contacting the whey with an anion exchanger to adsorb a first κ-casein macropeptide fraction;

c. eluting the first adsorbed fraction;

d. adjusting the eluted product of step (c) to a pH less than about 4; and e. fractionating the eluted product of step (d) by contacting the product of step (d) with a cation exchanger to adsorb other proteins and collecting the unadsorbed fraction to obtain substantially purified κ-casein macropeptide.

22. The process of claim 2 comprising eluting the adsorbed fraction on the anion exchanger to yield the κ-casein macropeptide product.

* * * * *